Patented Dec. 1, 1942

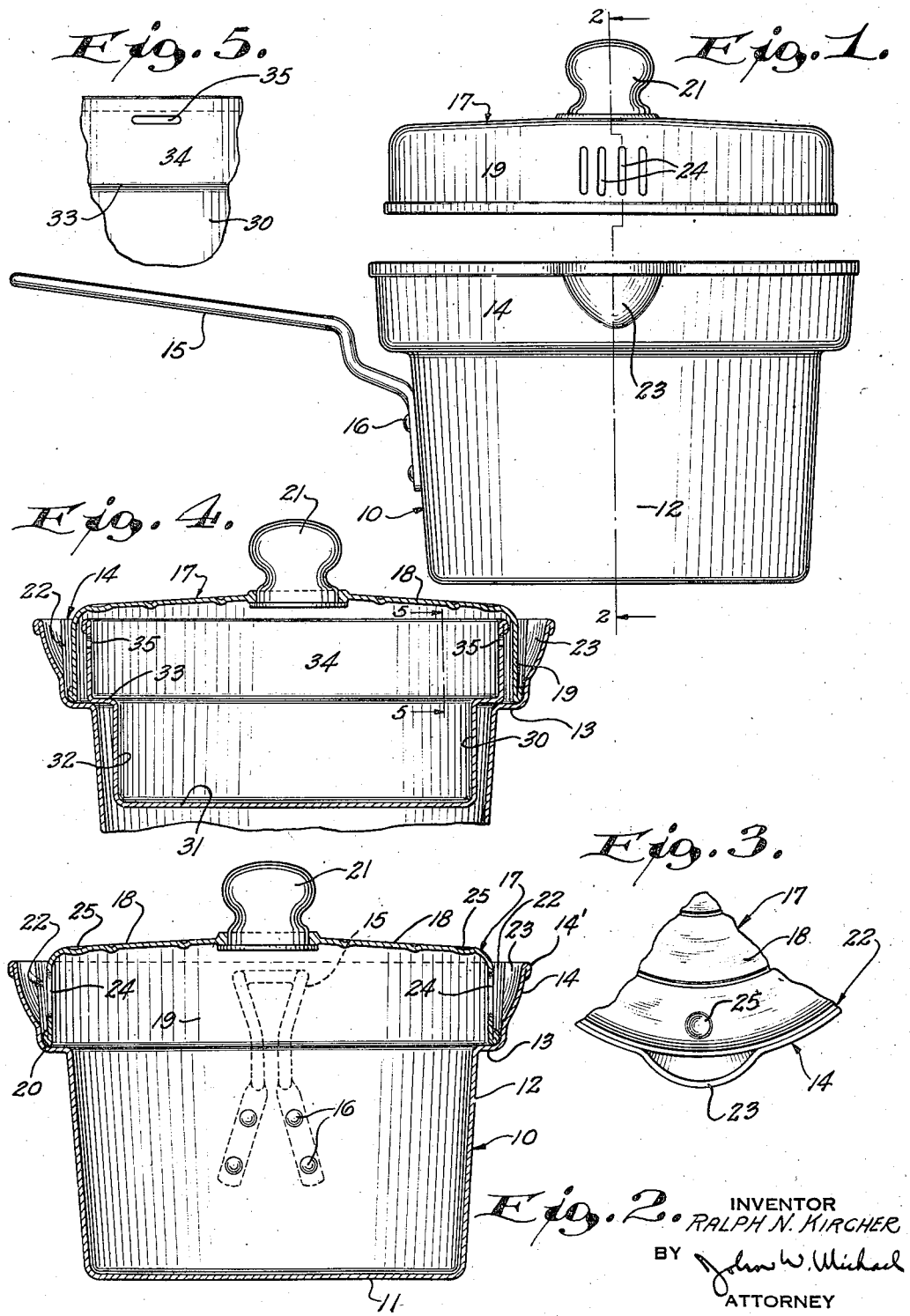

2,303,841

UNITED STATES PATENT OFFICE 2,303,841

COOKING UTENSIL

Ralph N. Kircher, West Bend, Wis., assignor to West Bend Aluminum Company, West Bend, Wis., a corporation of Wisconsin Application November 10, 1939, Serial No. 303,755

1 Claim. (Cl. 221—162)

This invention relates to an improvement in cooking utensils.

One of the principal objects of the present invention is to provide a cooking utensil which is so constituted that liquid in the utensil may be poured or drained therefrom without removing the cover with which the utensil is equipped.

Another object of the invention is to provide a cooking utensil, which may be selectively employed as an ordinary sauce pan or pot, or as a double boiler.

A further object of the invention is to provide a cooking utensil having these advantages and capacities, and which is simple and durable in construction, reliable and efficient in use, attractive in appearance, easily handled, and adapted to be manufactured with economy from materials and by means of facilities ordinarily available.

Other objects and advantages reside in certain novel features of the construction, arrangement, and combination of parts, which will be hereinafter more fully described and particularly pointed out in the appended claim, reference being had to the accompanying drawing forming a part of this specification, and in which:

Figure 1 is a view in side elevation illustrating a cooking utensil embodying the present invention and showing its cover lifted or disposed above the upper open end of the utensil.

Figure 2 is a view in transverse cross section taken on the line 2—2 of Figure 1 and looking in the direction of the arrows.

Figure 3 is a fragmentary detail view in top plan illustrating the locating boss or indentation formed in the top of the cover for the purpose of facilitating alinement of the draining slots of the cover with the pouring lip of the utensil.

Figure 4 is a fragmentary view in transverse vertical cross section showing the utensil constituted to serve as a double boiler; and Figure 5 is a fragmentary detail view taken on line 5—5 of Figure 4 and showing one of the circumferential slots provided on the inner vessel of the double boiler to facilitate its removal by means of a fork or the like.

Referring to the drawing it will be seen that in all embodiments of the invention the cooking utensil comprises a main or outer vessel, designated generally at 10, and which may be constituted of sheet metal, such as aluminum, or of any other suitable material. The outer vessel 10 has a bottom 11 and a peripheral wall 12 integral with the bottom and extending upwardly therefrom. Usually it is preferable to have a peripheral wall of the main vessel slightly tapered, as shown in the drawing.

Adjacent the upper open end of the outer vessel the peripheral wall 12 is provided with an outwardly directed annular flange 13 providing a horizontal seat or shoulder adjacent the upper end of the vessel 10. Above the flange 13 the vessel is formed with an upstanding annular flange 14, which completely surrounds the seat afforded by the flange 13. The upper edge of this flange 14 may be rolled or beaded, as at 14'.

The outer vessel is provided with a handle 15, which may be riveted, or otherwise suitably secured, to the peripheral wall of the vessel, as indicated at 16.

A cover, designated generally at 17, is provided, and has a plate-like body portion 18 and an integral depending peripheral flange 19 terminating around its lower edge in a roller bead 20. Centrally the plate 18 of the cover is provided with a knob or handle 21.

When the cover is placed in position on the utensil its flange 20 is disposed within the confines of the flange 14 of the vessel, and the lower edge of the flange 19 of the cover rests on and is supported by the seat 13. In this way the cover is retained against displacement off of its seat or support on the outer vessel.

Moreover, the outer flange of the cover is surrounded by a trough-like annular space 22 defined by the inner surface of the flange 14 of the vessel 10 and the outer surface of the flange 19 of the cover 17.

To facilitate pouring of liquid from the vessel 10 it is provided on one or both sides with pouring lips 23, and the cover has its flange provided with draining or pouring slots 24. By shifting the cover angularly until the slots 24 are alined radially with the pouring lips, it is entirely practical to pour liquid from the vessel with the cover or lid in place, the liquid flowing through the slots 24 to the pouring lip, and issuing from the lip as a definite controlled stream. Obviously, this is advantageous in draining the hot water from potatoes or other vegetables.

For the purpose of facilitating alinement of slots and pouring lips, the plate-like body of the cover is preferably provided with a boss or indentation 25, one for each set of slots. This makes it easy for the housewife, or person using the utensil, to spot the cover thereon so that the drain slots 24 may be alined with the pouring lips 23.

In the form of the invention shown in Figure 4, in addition to the outer vessel 10, an inner vessel 30 is provided. It also has a closed bottom 31 and an integral upwardly and outwardly extending peripheral wall 32. Near the upper open end of the inner vessel 30 its outer peripheral wall is formed with an outwardly directed flange 33, surrounded by an upstanding vertical flange 34. In the assembly, as illustrated in Figure 4, the inner vessel is inserted in the outer vessel, and the horizontal flange 33 of the inner vessel 30 engages on and is supported by the annular seat 13 of the outer vessel 10. The same cover employed for the outer vessel may be employed for the cover for the double boiler, the space around the outside of the vertical flange of the inner vessel admitting of this dual use.

The upstanding flange 34 of the inner vessel 30 may have one or more horizontally extending arcuate slots 35 thereon to facilitate removal of the inner vessel 30 from the outer vessel 10, a fork or the like being inserted in such slot and used to lift the inner vessel out of the outer vessel.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claim.

I claim:

A cooking utensil comprising a vessel having an annular seat at its upper end, a flange upstanding from and surrounding said seat, an open top pouring lip formed in said flange and extending downwardly to a point above said seat, a cover having a depending peripheral flange, said depending flange being of substantially the same height as said upstanding flange, a bead on the lower end of said depending flange to engage said seat and the lower portion of said upstanding flange to hold said cover in place and form a seal, and a plurality of openings in said depending flange above said bead, said openings being grouped so as to be brought into substantial alinement with said lip.

RALPH N. KIRCHER.